United States Patent
Fukuda et al.

(10) Patent No.: US 11,578,393 B2
(45) Date of Patent: Feb. 14, 2023

(54) HEAT-RESISTANT SINTERED MATERIAL HAVING EXCELLENT HIGH-TEMPERATURE WEAR RESISTANCE AND SALT DAMAGE RESISTANCE AND METHOD FOR PRODUCING SAME

(71) Applicant: Diamet Corporation, Niigata (JP)

(72) Inventors: Ryosuke Fukuda, Niigata (JP); Masahisa Miyahara, Niigata (JP)

(73) Assignee: Diamet Corporation, Niigata (JP)

( * ) Notice: Subject to any disclaimer, the term of this patent is extended or adjusted under 35 U.S.C. 154(b) by 558 days.

(21) Appl. No.: 16/495,301

(22) PCT Filed: Mar. 26, 2018

(86) PCT No.: PCT/JP2018/011980
§ 371 (c)(1),
(2) Date: Sep. 18, 2019

(87) PCT Pub. No.: WO2018/198628
PCT Pub. Date: Nov. 1, 2018

(65) Prior Publication Data
US 2020/0095662 A1 Mar. 26, 2020

(30) Foreign Application Priority Data
Apr. 27, 2017 (JP) .............................. JP2017-088995

(51) Int. Cl.
*C22C 38/54* (2006.01)
*C22C 38/02* (2006.01)
(Continued)

(52) U.S. Cl.
CPC ............ *C22C 38/54* (2013.01); *C22C 38/002* (2013.01); *C22C 38/02* (2013.01); *F16C 33/145* (2013.01);
(Continued)

(58) Field of Classification Search
CPC ....... C22C 38/54; C22C 38/002; C22C 38/02; C22C 38/00; C22C 38/34; C22C 38/56;
(Continued)

(56) References Cited

U.S. PATENT DOCUMENTS

| 4,008,051 A | 2/1977 | Cadle | |
|---|---|---|---|
| 2013/0058825 A1* | 3/2013 | Fukae | B22F 3/16 419/11 |

(Continued)

FOREIGN PATENT DOCUMENTS

| JP | 60-155650 A | 8/1985 |
|---|---|---|
| JP | 61-000570 A | 1/1986 |

(Continued)

OTHER PUBLICATIONS

"Sintering Behavior of Elemental Powders with FeB Addition in the Composition of Martensitic Stainless Steel", JMPEG vol. 16, 2007, pp. 726-729 (Akhtar) (Year: 2007).*

(Continued)

*Primary Examiner* — Daniel J. Schleis
*Assistant Examiner* — Kevin Ct Li
(74) *Attorney, Agent, or Firm* — Leason Ellis LLP; Melvin C. Garner; Mitsuhiro Haraguchi (57) ABSTRACT

This heat-resistant sintered material has, as an overall composition, a composition including, in terms of % by mass, Cr: 15% to 30%, Ni: 8% to 30%, Si: 2.0% to 6.0%, and C: 0.5% to 2.5% with a remainder being Fe and inevitable impurities, wherein the heat-resistant sintered material has a structure in which hard phases are dispersed in a matrix, the matrix includes Fe, Cr, Ni, and Si, the hard phase includes Fe, Cr, and C, and a porosity is 2.0% or less.

6 Claims, 2 Drawing Sheets

(51) Int. Cl.
*C22C 38/00* (2006.01)
*F16C 33/14* (2006.01)
*B22F 3/10* (2006.01)
*B22F 5/10* (2006.01)

(52) U.S. Cl.
CPC ............... *B22F 3/10* (2013.01); *B22F 5/106* (2013.01); *B22F 2301/35* (2013.01); *B22F 2302/05* (2013.01)

(58) Field of Classification Search
CPC ... C22C 1/08; C22C 33/0207; C22C 33/0285; C22C 33/0228; C22C 2211/001; C22C 2211/004; F16C 33/145; B22F 3/10; B22F 3/11; B22F 5/106; B22F 5/008; B22F 2301/35; B22F 2302/05; B22F 2998/10
See application file for complete search history.

(56) References Cited

U.S. PATENT DOCUMENTS

2013/0251585 A1    9/2013   Fukae et al.
2016/0318103 A1*  11/2016   Bergman ................. B22F 3/23

FOREIGN PATENT DOCUMENTS

| JP | 2009-035786 A | 2/2009 | |
| JP | 2013-057094 A | 3/2013 | |
| JP | 2013-163854 A | 8/2013 | |
| JP | 2016-186109 A | 10/2016 | |
| WO | WO-2012/140057 A1 | 10/2012 | |
| WO | WO-2012140057 A1 * | 10/2012 | ............... B22F 3/12 |
| WO | WO-2015/091366 A1 | 6/2015 | |
| WO | WO-2015091366 A1 * | 6/2015 | ........... B22F 1/0059 |
| WO | WO-2017/073422 A1 | 5/2017 | |

OTHER PUBLICATIONS

European Search Report dated Oct. 8, 2020 for the corresponding European Patent Application No. 18792053.3.
Chinese Office Action dated Nov. 10, 2020 for the corresponding Chinese Patent Application No. 201880016392.7.
International Search Report dated Jun. 26, 2018 for the corresponding PCT International Application No. PCT/JP2018/011980.

* cited by examiner

HEAT-RESISTANT SINTERED MATERIAL HAVING EXCELLENT HIGH-TEMPERATURE WEAR RESISTANCE AND SALT DAMAGE RESISTANCE AND METHOD FOR PRODUCING SAME

CROSS-REFERENCE TO RELATED PATENT APPLICATIONS

This application is a U.S. National Phase Application under 35 U.S.C. § 371 of International Patent Application No. PCT/JP2018/011980, filed Mar. 26, 2018, and claims the benefit of priority to Japanese Patent Application No. 2017-088995 filed on Apr. 27, 2017, all of which are incorporated herein by reference in their entirety. The International Application was published in Japanese on Nov. 1, 2018 as International Publication No. WO/2018/198628 under PCT Article 21(2).

FIELD OF THE INVENTION

The present invention relates to a heat-resistant sintered material having excellent high-temperature wear resistance and salt damage resistance and a method for producing the same.

BACKGROUND OF THE INVENTION

A turbocharger is known which is configured to increase the thermal efficiency of an internal combustion engine by rotating a turbine at a high speed using the energy of exhaust gas in the internal combustion engine, driving a centrifugal compressor using the rotational force of the turbine, and sending compressed air into the engine.

In the turbocharger attached to the internal combustion engine, a nozzle mechanism or a valve mechanism is provided which is configured to divide some of the exhaust gas and to adjust the amount of the exhaust gas flowing into the turbine.

A mechanism component (mechanical part) configured to be installed in the turbocharger such as a bearing, a bush, or the like is always exposed to high-temperature corrosive exhaust gas that is exhausted from the engine. Furthermore, this mechanism component is a movable component and desirably excellent in terms of sliding characteristics as well.

As a sliding component that is exposed to this type of high-temperature corrosive exhaust gas, in the related art, a heat-resistant component consisting of a product made from a molten material or a sintered material of high-Cr cast steel has been used.

As an example of the sliding component that is known in the related art, a sintered alloy is known which has the overall composition including, in terms of % by mass, Cr: 11.75% to 39.98%, Ni: 5.58% to 24.98%, Si: 0.16% to 2.54%, P: 0.1% to 1.5%, and C: 0.58% to 3.62% with a remainder being Fe and inevitable impurities (refers to Japanese Unexamined Patent Application, First Publication No. 2013-057094). This sintered alloy is known to have a metallographic structure in which phases A and phases B are distributed in a macular shape, metal carbides having an average particle diameter of 10 to 50 μm are precipitated in the phase A, metal carbides having an average particle diameter of 10 μm or less are precipitated in the phase B, and an average particle diameter DA of the metal carbides precipitated in the phase A and an average particle diameter DB of the metal carbides precipitated in the phase B adequately achieve DA>DB (refers to Japanese Unexamined Patent Application, First Publication No. 2013-057094).

In addition, a heat-resistant sintered material having a composition containing, in terms of % by mass, Cr: 25% to 50%, Ni: 2% to 25%, and P: 0.2% to 1.2% with a remainder being Fe and inevitable impurities and a structure including a Fe—Cr matrix and hard phases consisting of Cr—Fe alloy grains precipitated in the interior of the Fe—Cr matrix is known (refer to Japanese Unexamined Patent Application, First Publication No. 2016-186109). In this heat-resistant sintered material, it is known that the amount of Cr in the Fe—Cr matrix is 24% to 41% in terms of % by mass, the amount of Cr in the hard phase is 30% to 61% in terms of % by mass, and the effective porosity is 2% or less (refer to Japanese Unexamined Patent Application, First Publication No. 2016-186109).

Furthermore, a sintered member is known in which at least one of a barium compound, a strontium compound, mica, an aluminum silicon complex oxide (composite oxide), and alumina is dispersed as a solid lubricant in either one of an austenitic stainless steel alloy, a martensitic stainless steel alloy, or a ferritic stainless steel alloy which contains 10% to 35% by mass of Cr, and the amount of the solid lubricant is 3% to 50% by volume (refer to Japanese Unexamined Patent Application, First Publication No. 2013-163854).

Examples of characteristics desired for this type of heat-resistant member in the related art including the sintered materials described in Japanese Unexamined Patent Application, First Publication No. 2013-057094, Japanese Unexamined Patent Application, First Publication No. 2016-186109 and Japanese Unexamined Patent Application, First Publication No. 2013-163854 include wear resistance (self-wear property), salt damage resistance, and the like, and development of a product made from a molten material or sintered material of high-Cr cast steel capable of adequately achieving these requirements is underway.

For example, as a product made from a molten material of ferrite-based high-Cr cast steel, an alloy having a composition represented by Fe-34Cr-2Mo-2Si-1.2C is known, and, as a sintered material of ferrite-based high-Cr cast steel, a sintered alloy having a composition represented by Fe-34Cr-2Mo-2Si-2C is known.

In the related art, among turbo components, a bush that is likely to be exposed to the outside is demanded to have salt damage resistance as well as oxidation resistance and wear resistance.

In contrast, with regard to a dispersion material of Cr carbide of the related art, C and Cr react with each other; and thereby, the Cr carbide is precipitated. Therefore, in the case where a large amount of hard phases are precipitated, the amount of Cr in the matrix decreases, and salt damage resistance and oxidation resistance degrade. In the case where the amount of the hard phases decreases, a decrease in the amount of Cr in the matrix can be prevented, but wear resistance degrades.

Ceramic particles are hard particles having excellent salt damage resistance and oxidation resistance, but have a weak bonding force with the matrix, and there may be a case where the ceramic particle peels off and drops while sliding. Therefore, a heat-resistant sintered material including the ceramic particles is not excellent in terms of wear resistance under a high load. In addition, high-chromium powder that is used for a dispersion material of a high-chromium alloy includes a large amount of chromium, and thus it is difficult to decrease the amount of oxygen during the production of the powder, and a large amount of oxygen is included. Therefore, in order to obtain a dense sintered material, it is necessary to increase the sintering temperature. As a result, the structure becomes coarse, and thus the strength decreases, and wear resistance is unsatisfactory. In addition, there is a concern that a σ phase is generated, and in the case where the σ phase is generated, there is a problem in that the high-chromium powder becomes highly brittle and strength, wear resistance, salt damage resistance, and workability deteriorate.

As described above, in the related art, a material capable of adequately achieving both wear resistance and salt damage resistance while having oxidation resistance is not provided.

SUMMARY OF THE INVENTION

Problems to be Solved by the Invention

The present invention has been made in consideration of the above-described circumstances, and an object of the present invention is to provide a heat-resistant sintered material having oxidation resistance and being excellent in terms of both wear resistance and salt damage resistance and a method for producing the same.

Solutions for Solving the Problems

As a result of intensive study regarding the wear resistance and salt damage resistance of a sintered material under the above-described background, the present inventors found the following.

Cr and C react with each other in an austenitic stainless steel; and thereby, hard particles of Cr carbide are precipitated. The amount of Cr in a matrix decreases due to the precipitation of the hard particles, however, Si is diffused in the matrix; and thereby, the degradation of the salt damage resistance caused by the decrease in the amount of Cr can be compensated, and the oxidation resistance can be compensated. It was found that it is possible to provide a heat-resistant sintered material having oxidation resistance and being excellent in terms of both wear resistance and salt damage resistance using this relationship, and the present invention was reached.

(1) In order to achieve the above-described object, a heat-resistant sintered material having excellent high-temperature wear resistance and salt damage resistance according to an aspect of the present invention has, as an overall composition, a composition including, in terms of % by mass, Cr: 15% to 30%, Ni: 8% to 30%, Si: 2.0% to 6.0%, and C: 0.5% to 2.5% with a remainder being Fe and inevitable impurities, wherein the heat-resistant sintered material has a structure in which hard phases are dispersed in a matrix, the matrix includes Fe, Cr, Ni, and Si, the hard phase includes Fe, Cr, and C, and a porosity is 2.0% or less.

According to the structure in which the hard phases including Fe, Cr, and C are dispersed in the matrix including Fe, Cr, Ni, and Si, it is possible to increase the strength of the matrix by the addition of Si, and, furthermore, it is possible to improve wear resistance by the dispersion of chromium carbide-based hard phases. In addition, according to the structure made to be dense by decreasing the porosity, it is possible to obtain a dense sintered material. Therefore, it is possible to obtain a sintered material having excellent salt damage resistance which has little concern of corrosion propagating inside even when exposed to corrosive liquid or gas.

Therefore, it is possible to provide a heat-resistant sintered material capable of adequately achieving both excellent salt damage resistance and wear resistance while maintaining excellent oxidation resistance.

(2) In the heat-resistance sintered material according to the aspect of the present invention, the overall composition may further include, in terms of % by mass, either one or both of B: 0.08% to 0.8% and P: 0.2% to 1.2%.

(3) In the heat-resistance sintered material according to the aspect of the present invention, the matrix may consist of an austenite matrix, the hard phases may be hard particles including Fe, Cr, and C, and the hard particles may be dispersed in the austenite matrix in an amount of 10% to 40% by volume.

(4) A method for producing a heat-resistant sintered material having excellent high-temperature wear resistance and salt damage resistance according to an aspect of the present invention includes: a step of mixing a base powder and an additive material powder so as to obtain a mixed powder having a composition containing, in terms of % by mass, Cr: 15% to 30%, Ni: 8% to 30%, Si: 2.0% to 6.0%, and C: 0.5% to 2.5% with a remainder being Fe and inevitable impurities; a step of pressurizing the mixed powder so as to produce a green compact; and a step of heating the green compact at a temperature of 1,100° C. to 1,280° C. so as to form a sintered body having a porosity of 2.0% or less and a structure in which hard phases including Fe, Cr, and C are dispersed in a matrix including Fe, Cr, Ni, and Si, wherein the base powder includes Fe, Cr, and Ni or includes Fe, Cr, Ni, and Si, and the additive material powder includes at least Si and C or includes either one or both of Fe and Cr together with Si and C.

When a raw material powder (mixed powder) is adjusted, the base powder including at least Fe, Cr, and Ni and the additive material powder including at least Si and C and further including at least one of Fe and Cr as necessary are mixed together. Therefore, it is possible to adjust the raw material powder in a state in which the amount of Si included in the base powder is suppressed. In addition, it is possible to diffuse Si included in the additive material powder during sintering and to increase the amount of Si in the matrix to be in a range of 2.0% to 6.0%.

Therefore, the mixed powder (powder mixture) is obtained using the base powder and the additive material powder that are the above-described raw materials; and thereby, it is possible to increase the strength of the matrix after sintering, and it is possible to produce a heat-resistant sintered material having excellent wear resistance in association with the precipitation of the hard phases. In addition, it is possible to obtain a heat-resistant sintered material having excellent salt damage resistance by including a high concentration of Si in the matrix and decreasing the porosity.

(5) In the method for producing a heat-resistant sintered material according to the aspect of the present invention, either one or both of FeB powder and FeP powder may be mixed with the base powder and the additive material powder.

(6) In the method for producing a heat-resistant sintered material according to the aspect of the present invention, the hard phases may be dispersed in the matrix in an amount of 10% to 40% by volume by the step of forming the sintered body.

Effects of the Invention

In the aspect of the present invention, the overall composition contains specific amounts of Fe, Cr, Ni, Si, and C, and the sintered material has the structure in which the hard phases including Cr, Fe, and C are dispersed in the matrix including Fe, Cr, Ni, and Si. The strength of the matrix can be increased by increasing the amount of Si contained in the matrix, and the wear resistance can be improved by dispersing the chromium carbide-based hard phases. In addition, according to the structure made to be dense by decreasing the porosity, it is possible to obtain a dense sintered material. Therefore, it is possible to obtain a sintered material having excellent salt damage resistance which limits corrosion propagating inside even after exposure to corrosive liquid or gas.

Therefore, it is possible to provide a heat-resistant sintered material capable of adequately achieving both excellent salt damage resistance and wear resistance while maintaining excellent oxidation resistance.

Therefore, the heat-resistant sintered material according to the aspect of the present invention can be effectively applied as a mechanism component (mechanical part) such as a bearing, a bush, or the like that is installed in a turbocharger. In this case, even in the case where the mechanism component is always exposed to high-temperature corrosive exhaust gas that is exhausted from an engine, the mechanism component does not easily corrode or deteriorate, and an excellent sliding characteristic as a movable component can be obtained.

DETAILED DESCRIPTION OF THE INVENTION

Hereinafter, an embodiment of the present invention will be described with reference to drawings.

Figure 1:
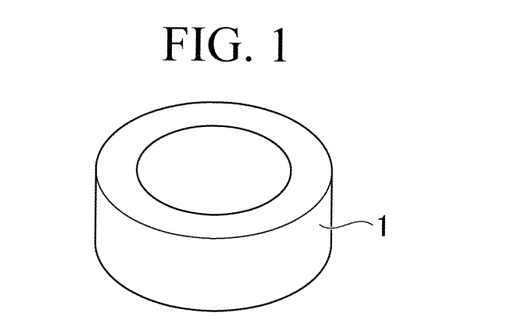
FIG. 1 is a perspective view showing an example of a bearing member formed of a sintered sliding material according to the present embodiment.
Figure 2:
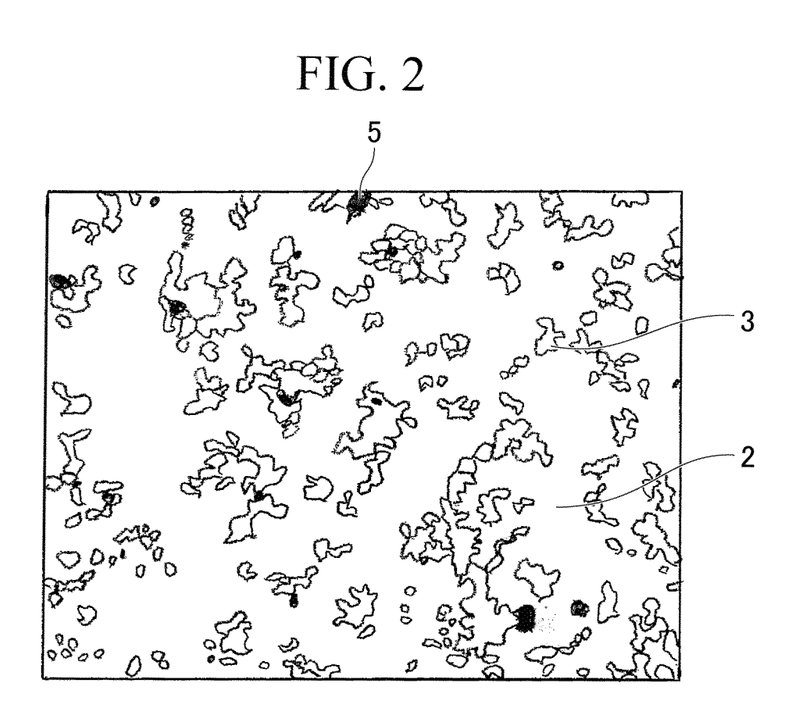
FIG. 2 is a schematic view showing an example of a metallographic structure of the bearing member.

FIG. 1 shows a tubular (cylindrical) bearing member 1 consisting of a heat-resistant sintered material according to the present embodiment. This bearing member 1 is used as a bearing that is installed in a nozzle mechanism or a valve mechanism for a turbocharger as an example. FIG. 2 is a schematic view of an enlarged structural photograph of a heat-resistant sintered material configuring the bearing member 1.

The heat-resistant sintered material has, as an example, a structure in which a plurality of irregular hard phases 3 including Cr, Fe, and C are dispersed in a matrix 2 including Fe, Cr, Ni, and Si as shown in FIG. 2. In addition, in the structure shown in FIG. 2, a plurality of holes (pores) 5 indicated by black circles are scattered.

The matrix 2 has, as an example, a composition including, in terms of % by mass, Cr: 10.0% to 28.0%, Ni: 9.0% to 33.0%, and Si: 2.5% to 7.0% with a remainder being Fe and inevitable impurities. In order to obtain the above-described matrix 2, the overall composition needs to include 15% to 30% of Cr.

The hard phase 3 has, as an example, a composition including, in terms of % by mass, Cr: 40.0% to 75.0%, Ni: 0.5% to 3.0%, and C: 5.0% to 8.5% with a remainder being Fe and inevitable impurities. Therefore, the hard phase 3 is also said to include Fe, Cr, Ni, and C. The volume fraction of the hard phases 3 in the entire structure is preferably in a range of 10% to 40%.

In addition, it is preferable that the heat-resistant sintered material has, as an overall composition, a composition including, in terms of % by mass, Cr: 15% to 30%, Ni: 8% to 30%, Si: 2.0% to 6.0%, and C: 0.5% to 2.5% with a remainder being Fe and inevitable impurities and the porosity in the entire structure is 2.0% or less.

The matrix 2 including Fe, Cr, Ni, and Si consists of, as an example, Fe—Cr—Ni—Si, and the hard phase 3 including Cr, Fe, and C is, as an example, a carbide phase consisting of Cr—Fe—C or Cr—Ni—Fe—C.

From the results of the energy dispersive X-ray fluorescence analysis (EDX analysis) of a specimen of examples described below, the compositions of the matrix 2 and the hard phase 3 are determined to be the above-described compositions.

Hereinafter, the reasons for limiting respective compositional ratios (amounts of the respective elements) in the heat-resistant sintered material of the present embodiment will be described.

"Amount of Cr: 15% to 30% by Mass"

Regarding the amount of Cr in the matrix 2, the matrix needs to include at least 12% by mass of Cr from the viewpoint of oxidation resistance. In order to adequately achieve not only oxidation resistance but also salt damage resistance, the matrix needs to include 28% by mass or more of Cr. However, Si and Ni also contribute to oxidation resistance and salt damage resistance, and thus the amount of Cr in the overall composition only has to be 15% by mass or more. In addition, in the case where the amount of Cr exceeds 30% by mass in the overall composition, a large amount of ferrite phases are generated in association with the influence of the addition of Si. Therefore, in order to obtain an austenite phase, the amount of Cr in the overall composition is desirably set to be 30% by mass or less.

The amount of Cr in the matrix 2 is decreased due to the precipitation of the hard phases 3, and thus, in order to adequately achieve not only oxidation resistance but also salt damage resistance in consideration of the amount of Cr in the matrix 2, it is necessary to set the amount of Cr, as a whole (in the overall composition) to be 15% to 30% by mass. The amount of Cr in the overall composition is preferably 20% to 30% by mass.

"Amount of Ni: 8% to 30% by Mass"

Ni is an element that stabilizes an austenite phase and also contributes to the improvement of salt damage resistance. In order to stably obtain an austenite phase, it is necessary to set the amount of Ni in the overall composition to be 8% by mass or more. Even in the case where the amount of Ni in the overall composition exceeds 30%, an effect for improving salt damage resistance is small, and, simply, the amount of expensive Ni used is increased. Therefore, the amount of Ni in the overall composition is preferably set to be 8% to 30% by mass. The amount of Ni in the overall composition is more preferably 15% to 30% by mass.

"Amount of Si: 2.0% to 6.0% by Mass"

In order to achieve adequate salt damage resistance, it is necessary to set the amount of Si, as a whole (in the overall composition), to be 2.0% by mass or more. In the case where the amount of Si in the overall composition exceeds 6.0% by mass, there is a concern that the heat-resistant sintered material may become too hard, machinability may deteriorate, and the heat-resistant sintered material may become a material having poor workability. Therefore, from the viewpoint of salt damage resistance, wear resistance, and productivity, it is necessary to set the amount of Si in the overall composition to be 2.0% to 6.0% by mass. The amount of Si in the overall composition is preferably 3.5% to 6.0% by mass.

"Amount of C: 0.5% to 2.5% by Mass"

In the case where the amount of C in the overall composition is less than 0.5% by mass, the amount of the precipitated hard phases 3 is small, and wear resistance is not satisfied. In addition, in the case where the amount of C in the overall composition exceeds 2.5% by mass, the amount of the precipitated hard phases 3 becomes too large, and the amount of Cr in the matrix 2 decreases, and thus salt damage resistance is not satisfied. Therefore, it is necessary to set the amount of C included in the overall composition to be 0.5% to 2.5% by mass. The amount of C in the overall composition is preferably 1.5% to 2.5% by mass.

"B: 0.08% to 0.8%" and "P: 0.2% to 1.2%"

Either one or both of B and P may be included as necessary. The amount of B in the overall composition is preferably 0.08% to 0.8%. The amount of P in the overall composition is preferably 0.2% to 1.2%.

"Porosity: 2.0% or Less"

In the case where the porosity is large, the surface area increases, and the heat-resistant sintered material is likely to be oxidized. Therefore, a small porosity enables the improvement of oxidation resistance and salt damage resistance, and the porosity is desirably set to be 2.0% or less.

"Production Method"

A method for producing the heat-resistant sintered material will be described below in detail. As an example, Fe—Cr—Ni—Si alloy powder as the base powder, SiC powder or FeSi powder+C powder as the additive material powder, and FeB powder as a sintering aid (sintering agent) are weighed so as to be in the above-described compositional ranges and are uniformly mixed together; and thereby, a mixed powder is obtained. The obtained mixed powder is subjected to press molding at a pressure of approximately 490 to 980 MPa. The obtained press-molded body is sintered at a temperature of 1,100° C. to 1,280° C. for approximately 0.5 to 2 hours. As a result, the heat-resistant sintered material is obtained.

The composition of the mixed powder almost coincides with the composition of the heat-resistant sintered material; however, strictly speaking, it is preferable to blend powders that serve as raw materials to obtain the mixed powders so that a heat-resistant sintered material having a targeted composition (the above-described compositional range) is obtained.

As the base powder, Fe—Cr—Ni alloy powder may be used instead of Fe—Cr—Ni—Si alloy powder. That is, the base powder includes Fe, Cr, and Ni or includes Fe, Cr, Ni, and Si. Specifically, as the base powder, an alloy powder consisting of Fe, Cr, and Ni or an alloy powder consisting of Fe, Cr, Ni, and Si is an exemplary example.

As the sintering aid, FeP powder can be used instead of FeB powder, and both FeB powder and FeP powder may also be used. In addition, the sintering aid may not be used.

As the additive material powder, in addition to SiC, FeSi powder+C powder, CrSi powder+C powder, or the like may be mixed with the base powder so as to be in the above-described compositional ranges. That is, the additive material powder includes at least Si and C or includes either one or both of Fe and Cr together with Si and C. Specifically, as the additive material powder, SiC powder or a mixture of C powder and either one or both of FeSi powder and CrSi powder is an exemplary example.

In the case of using the respective powders described above, the particle diameter (D50) of each of the powders is preferably set to be approximately 5 to 100 µm.

In the case of using FeB powder as the sintering aid, the added amount of the FeB powder is desirably adjusted so that the amount of B in the overall composition of the mixed powder is, in terms of % by mass, in a range of 0.08% to 0.8%.

In the case of using FeP powder as the sintering aid, the added amount of the FeP powder is desirably adjusted so that the amount of P in the overall composition of the mixed powder is, in terms of % by mass, in a range of 0.2% to 1.2%.

As the sintering aid, any one of FeB and FeP may be used. In the case of using fine powders having a particle diameter of 5 to 20 µm as the raw material powders being used as the base powder and the like, these sintering aids may not be used.

In the case of using powders having a particle diameter of approximately 30 to 100 µm as the raw material powders in the production of the mixed powder, a targeted heat-resistant sintered material can be produced by adding approximately 0.4% to 4.0% of the sintering aid and sintering the mixed powder. In the case of not using the sintering aid, a targeted heat-resistant sintered material can be produced by using fine powders having a particle diameter of approximately 5 to 20 µm as the raw material powders.

As the raw material powder, a powder having a particle diameter (D50) of 10 µm can be sufficiently produced; however, in the case where the particle diameter is 10 µm or less, the ratio of the surface area to the volume of the powder increases, the amount of oxygen in the powder increases, and sinterability degrades. Therefore, in the case where fine powders having a particle diameter of less than 5 µm are used, there is a fear that a porosity of 2.0% or less cannot be achieved. In the case of a fine powder, it is possible to use, for example, a powder having a particle diameter of 5 to 20 µm. In the case of using a raw material powder having a particle diameter that exceeds this range (more than 20 µm), it becomes necessary to add the sintering aid.

As the base powder, it is possible to use Fe-25Cr-20Ni alloy powder, Fe-18Cr-12Ni alloy powder, or the like, and the powder of an SUS310S alloy, the powder of an SUS316 alloy, the powder of an SUS304 alloy, and the like, which are specified by JIS, may also be used. The amount of Si in the matrix 2 can be adjusted to be a necessary amount or more by adding a necessary amount of SiC powder, CrSi powder, FeSi powder, or the like as a Si source.

The mixed powder is put in a mold of a press machine and is subjected to press molding; and thereby, a green compact having a targeted shape, for example, a tubular shape (cylindrical shape) is obtained. That is, the mixed powder is pressurized (pressure is applied to the mixed powder); and thereby, a green compact having a targeted shape is produced.

As a molding method, a variety of methods such as molding using a press machine, hot isostatic pressing (HIP), and cold isostatic pressing (CIP) may be employed.

This green compact is sintered, for example, at a predetermined temperature in a range of 1,100° C. to 1,280° C. for approximately 0.5 to 2 hours in a vacuum atmosphere or a nitrogen atmosphere. Thereby, it is possible to obtain, for example, a tubular bearing member 1 shown in FIG. 1. This bearing member 1 consists of a heat-resistant sintered material in which carbide-based hard phases including Cr, Fe, and C are dispersed in a matrix including Fe, Cr, Ni, and Si.

The heat-resistant sintered material that configures the bearing member 1 has, for example, a metallographic structure in which carbide-based hard phases 3 such as Cr—Fe—C-based hard phases, Cr—Ni—Fe—C-based hard phases or the like are dispersed in a Fe—Cr—Ni—Si-based matrix 2 as shown in FIG. 2. FIG. 2 is a schematic view of a photograph of a part of the structure of an example of a heat-resistant sintered material specimen produced in examples described below which is enlarged using an optical microscope. As shown in FIG. 2, the pores 5 generated at the time of sintering may somewhat (approximately 2.0% or less) remain in the metallographic structure of the heat-resistant sintered material 1.

In the case where Fe—Cr—Ni—Si alloy powder, FeB powder, and SiC powder are mixed together, and a mixed powder is subjected to press molding and sintering, FeB turns into a liquid phase, wets and spreads into the grain boundaries between other powder particles, and exhibits an action of burying the pores. Therefore, it is possible to bury the particle grain boundaries between the Fe—Cr—Ni—Si alloy powder and the SiC powder with FeB that has turned into a liquid phase. As a result, the porosity after sintering can be decreased. Therefore, it is possible to produce a high-density sintered material.

As is clear from a FeB binary system phase diagram, Fe and B that configure the FeB powder has a eutectic point at 1,174° C. in a composition of Fe-4% by mass of B. Therefore, the FeB powder exhibits a liquid phase since the powder becomes eutectic at the sintering temperature, this liquid phase acts as the sintering aid, and the sintering density is improved. Therefore, a sintered body in which the generated number of pores is small and the density after the sintering is high, that is, a dense sintered body having a low porosity can be obtained. The low porosity makes it difficult for corrosive liquid or gas to intrude into the sintered body from the outside; and thereby, oxidation resistance is improved.

In the case of sintering the mixed powder at the above-described temperature, Fe or Cr, Ni, and C present in the vicinity of the Fe—Cr—Ni—Si alloy powder mutually diffuses, and thus carbide-based hard phases 3 are precipitated, and a structure is formed in which these hard phases 3 are dispersed in the matrix. That is, a structure is formed in which the hard phases 3 that are carbide-based precipitates having a composition of Cr—Fe—C or Cr—Ni—Fe—C are dispersed in the Fe—Cr—Ni—Si matrix. Due to the dispersion of the hard phases 3, preferable wear resistance can be obtained.

The matrix 2 contains Cr, Ni, and Si in a Fe base. That is, the matrix 2 includes Fe as a main component and further includes Cr, Ni, and Si. Due to the matrix 2 containing Fe—Cr—Ni—Si, oxidation resistance and salt damage resistance are secured. Furthermore, the matrix 2 contains 2.5 to 7.0% of Si, and, due to the influence of Si, the strength of the matrix 2 can be increased. In addition, Cr—Fe—C-based hard phases 3 are precipitated in an amount in accordance with the amount of C that is supplied from SiC of the additive material powder. In association with the effect for improving the wear resistance of the hard phases 3 and the strength of the matrix 2, excellent wear resistance is obtained.

At the time of generating the hard phase 3, the hard phase 3 derives some of Cr from the matrix 2. However, Si is diffused in the matrix and a high concentration (2.5% to 7.0%) of Si is contained in the matrix, and thus it is possible to improve the salt damage resistance of the matrix and to increase the strength of the matrix.

In the present embodiment, a case where the ring-shaped bearing member 1 consists of the above-described heat-resistant sintered material has been described, but it is needless to say that the heat-resistant sintered material of the present embodiment can be broadly applied to a shaft member, a rod member, a bearing member, a plate, and the like that are provided in a nozzle mechanism or a valve mechanism in a turbocharger.

In the heat-resistant sintered material obtained using the above-described production method, both the matrix and the hard phase include a sufficient amount of Cr, and thus favorable oxidation resistance and salt damage resistance are exhibited. The hard phase consists of a phase harder than the matrix. In addition, the strength of the matrix is also improved by the matrix including a large amount of Si. Therefore, the heat-resistant sintered material has not only favorable oxidation resistance and salt damage resistance but also favorable wear resistance.

Therefore, the bearing member 1 is excellent in terms of oxidation resistance, salt damage resistance, and wear resistance. Therefore, the bearing member 1 can be preferably applied as a component that is exposed to high-temperature exhaust gas and slides the axis (shaft) such as a bearing portion in a turbocharger or the like.

It is needless to say that the heat-resistant sintered material of the present embodiment can be used not only as a constituent material of the axis (shaft) of a turbocharger, but also as a constituent material of a variety of mechanism components that are provided in an environment exposed to high-temperature corrosive gas and demand oxidation resistance, salt damage resistance, and wear resistance.

EXAMPLES

Hereinafter, the present invention will be described in more detail by showing examples, but the present invention is not limited to these examples.

Regarding a raw material powder, any of SUS310S alloy powder (particle diameter D50=100 μm), SUS316 alloy powder (particle diameter D50=100 μm), and SUS304 alloy powder (particle diameter D50=100 μm) specified by JIS was used as a base powder. FeB powder (particle diameter D50=30 μm) (sintering aid) and any of the following additive material powders were mixed therewith.

As the additive material powder, any of SiC powder (particle diameter D50=10 μm), a mixture of CrSi powder (particle diameter D50=10 μm)+C powder (particle diameter D50=20 μm), and a mixture of FeSi powder (particle diameter D50=50 μm)+C powder (particle diameter D50=10 μm) was used.

In addition, a specimen was produced using FeP powder (particle diameter D50=30 μm) instead of FeB powder as the sintering aid. Furthermore, without using the sintering aid, a specimen was produced using a raw material powder having a particle diameter (D50) of 10 μm.

These powders were blended together so as to obtain a final component composition (overall composition) shown in Table 1 and mixed together for 30 minutes using a V-type mixer. Next, the obtained mixed powder was subjected to press molding at a pressure of 490 to 980 MPa; and thereby, a tubular green compact was produced.

Next, this green compact was sintered in a vacuum atmosphere at a temperature of 1,100° C. to 1,280° C. for 0.5 to 2.0 hours; and thereby, a tubular heat-resistant sintered material was obtained.

All of the heat-resistant sintered materials were molded in a shape preferable for the following individual tests and used in the individual test.

"Porosity"

The porosity was measured using the Archimedes method.

"Oxidation Resistance Test"

In an oxidation resistance test, a ring-shaped heat-resistant sintered material (bearing member) having an overall composition shown in Table 1 and having dimensions of an outer diameter of 20 mm, an inner diameter of 10 mm, and a height of 5 mm was produced, and the test was carried out.

The heat-resistant sintered material was held in air at 800° C. for 100 hours. The amount of the weight changed before and after the holding of the heat-resistant sintered material at 800° C. was measured, and an increased amount due to oxidation was obtained from the changed amount of the weight and the surface area of the specimen. The determination criteria of the increased amount due to oxidation are described below. A specimen having an increased amount due to oxidation of 1 mg/cm$^2$ or less was evaluated as "○" (good), and a specimen having an increased amount due to oxidation of more than 1 mg/cm$^2$ was evaluated as "x" (poor).

"Wear Resistance Test"

In order to carry out a roll-on-block test, a columnar (circular cylinder) shaft was placed on a block (wear test specimen), and a test of reciprocally rotating this shaft by 90 degrees was carried out. The test was carried out at a measurement temperature of 600° C. for 30 minutes, and the number of times of reciprocal rotation was set to be 2,000, and the amount of wear was evaluated. That is, in a state in which the wear test specimen was heated to 600° C., the shaft was reciprocally rotated by 90 degrees 2,000 times for 30 minutes.

In the measurement of the amount of wear, a photograph of a worn surface was taken using a 3D microscope, and the wear depth was measured.

The wear test specimen was a rectangular-parallelepiped shaped block having dimensions of a length of 50 mm, a width of 10 mm, and a thickness of 5 mm and consisting of a specimen of the heat-resistant sintered material. The shaft of a mating material was a stainless steel rod consisting of SUS316 and having a diameter of 8 mm and a length of 150 mm. This stainless steel rod was pressed to the block at a load of 80 N and reciprocally rotated as a rotary shaft of a motor; and thereby, the test was carried out.

The determination criteria of the wear resistance test are described below. A specimen having a wear depth of less than 40 μm was evaluated as "○" (good), and a specimen having a wear depth of 40 μm or more was evaluated as "x" (poor).

"Salt Damage Resistant Test"

The salt damage resistance was evaluated by a salt spray test (based on JIS Z 2371). A saline water of a 5% NaCl aqueous solution was sprayed to the test specimen at 35° C. for 24 hours.

In the appearance of the test specimen after the test, the ratio of a rust-generated area (the ratio of a corroded area) was measured.

The test specimen was a ring-shaped test specimen consisting of the specimen of the heat-resistant sintered material and having an outer diameter of 20 mm, an inner diameter of 10 mm, and a height of 5 mm.

A specimen in which a ratio of a corroded area due to the generation of rust was 1% or less was regarded as pass. In detail, a specimen in which a ratio of a corroded area due to rust was 1% or less was evaluated as "○" (good), and a specimen in which a ratio of a corroded area due to rust was more than 1% was evaluated as "x" (poor).

The above-described test results are shown in Tables 1 and 2.

TABLE 1

| Specimen No. | Total composition (% by mass) | | | | | | | Porosity | |
|---|---|---|---|---|---|---|---|---|---|
| | Fe | Cr | Ni | C | B | P | Si | | |
| 1 | 53.6 | 24.0 | 19.2 | 0.9 | 0.20 | | 2.1 | 0.2% | Example |
| 2 | 50.9 | 23.8 | 18.4 | 1.9 | 0.20 | | 4.9 | 0.2% | Example |
| 3 | 49.6 | 25.9 | 17.7 | 0.9 | 0.20 | | 5.8 | 0.4% | Example |
| 4 | 51.0 | 29.0 | 16.8 | 0.9 | 0.20 | | 2.1 | 0.5% | Example |
| 5 | 59.3 | 15.5 | 22.0 | 0.9 | 0.20 | | 2.1 | 0.7% | Example |
| 6 | 68.7 | 14.6 | 13.4 | 0.9 | 0.20 | | 2.1 | 0.4% | Comparative Example |
| 7 | 47.0 | 30.5 | 15.6 | 0.9 | 0.20 | | 5.8 | 0.5% | Comparative Example |
| 8 | 50.3 | 22.5 | 24.1 | 0.9 | 0.20 | | 2.1 | 0.8% | Example |
| 9 | 49.3 | 22.0 | 25.5 | 0.9 | 0.20 | | 2.1 | 0.8% | Example |
| 10 | 64.2 | 23.5 | 8.2 | 0.9 | 0.20 | | 3.0 | 0.5% | Example |
| 11 | 65.0 | 23.5 | 7.5 | 0.9 | 0.20 | | 3.0 | 0.6% | Comparative Example |
| 12 | 48.7 | 26.3 | 17.7 | 0.9 | 0.20 | | 6.2 | 0.4% | Comparative Example |
| 13 | 53.6 | 24.8 | 19.3 | 0.6 | 0.20 | | 1.4 | 0.3% | Comparative Example |
| 14 | 50.1 | 28.7 | 16.5 | 2.3 | 0.20 | | 2.1 | 0.5% | Example |
| 15 | 53.2 | 24.8 | 19.1 | 0.6 | 0.20 | | 2.2 | 0.4% | Example |
| 16 | 50.3 | 28.5 | 16.3 | 2.7 | 0.20 | | 2.1 | 0.40% | Comparative Example |
| 17 | 53.6 | 24.5 | 19.2 | 0.4 | 0.20 | | 2.1 | 0.30% | Comparative Example |
| 18 | 53.9 | 23.6 | 19.0 | 0.9 | | 0.60 | 2.1 | 0.40% | Example |
| 19 | 53.6 | 24.1 | 19.3 | 0.9 | | | 2.1 | 0.20% | Example |
| 20 | 53.6 | 24.1 | 19.3 | 0.9 | | | 2.1 | 1.50% | Example |
| 21 | 53.6 | 24.1 | 19.3 | 0.9 | | | 2.1 | 2.20% | Comparative Example |
| 22 | 53.7 | 24.0 | 19.2 | 0.9 | 0.08 | | 2.1 | 1.20% | Example |

TABLE 1-continued

| Specimen No. | Total composition (% by mass) | | | | | | | Porosity | |
|---|---|---|---|---|---|---|---|---|---|
| | Fe | Cr | Ni | C | B | P | Si | | |
| 23 | 53.2 | 23.9 | 19.1 | 0.9 | 0.8 | | 2.1 | 0.70% | Example |
| 24 | 53.6 | 24.1 | 19.2 | 0.9 | 0.06 | | 2.1 | 6.40% | Comparative Example |
| 25 | 53.1 | 23.9 | 19.1 | 0.9 | 0.9 | | 2.1 | 0.60% | Comparative Example |
| 26 | 53.7 | 24.0 | 19.1 | 0.9 | | 0.2 | 2.1 | 0.90% | Example |
| 27 | 54.0 | 23.2 | 18.5 | 0.9 | | 1.2 | 2.1 | 0.50% | Example |
| 28 | 53.6 | 24.1 | 19.2 | 0.9 | | 0.1 | 2.1 | 7.00% | Comparative Example |
| 29 | 53.9 | 23.2 | 18.5 | 0.9 | | 1.3 | 2.1 | 1.20% | Comparative Example |

TABLE 2

| Specimen No. | Oxidation resistance | | Salt damage resistance | Wear resistance | | |
|---|---|---|---|---|---|---|
| | Increased amount due to oxidation (mg/cm$^2$) 800° C. | Determination | Ratio of rust area (1% or less) | Amount of wear (μm) | Determination | |
| 1 | 0.2 | ○ | ○ | 29 | ○ | Example |
| 2 | 0.2 | ○ | ○ | 25 | ○ | Example |
| 3 | 0.3 | ○ | ○ | 35 | ○ | Example |
| 4 | 0.4 | ○ | ○ | 33 | ○ | Example |
| 5 | 0.8 | ○ | ○ | 35 | ○ | Example |
| 6 | 1.3 | x | x | 37 | ○ | Comparative Example |
| 7 | 0.4 | ○ | ○ | 26 | ○ | Comparative Example |
| 8 | 0.5 | ○ | ○ | 30 | ○ | Example |
| 9 | 0.7 | ○ | ○ | 28 | ○ | Example |
| 10 | 0.6 | ○ | ○ | 33 | ○ | Example |
| 11 | 0.9 | ○ | x | 35 | ○ | Comparative Example |
| 12 | 0.2 | ○ | ○ | 34 | ○ | Comparative Example |
| 13 | 0.3 | ○ | x | 38 | ○ | Comparative Example |
| 14 | 0.4 | ○ | ○ | 22 | ○ | Example |
| 15 | 0.3 | ○ | ○ | 37 | ○ | Example |
| 16 | 0.5 | ○ | x | 23 | ○ | Comparative Example |
| 17 | 0.3 | ○ | ○ | 44 | x | Comparative Example |
| 18 | 0.4 | ○ | ○ | 33 | ○ | Example |
| 19 | 0.3 | ○ | ○ | 30 | ○ | Example |
| 20 | 0.9 | ○ | ○ | 38 | ○ | Example |
| 21 | 1.5 | x | x | 43 | x | Comparative Example |
| 22 | 0.9 | ○ | ○ | 38 | ○ | Example |
| 23 | 0.6 | ○ | ○ | 32 | ○ | Example |
| 24 | 7.1 | x | x | 48 | x | Comparative Example |
| 25 | 0.7 | ○ | ○ | 31 | ○ | Comparative Example |
| 26 | 0.9 | ○ | ○ | 38 | ○ | Example |
| 27 | 0.5 | ○ | ○ | 33 | ○ | Example |
| 28 | 8.4 | x | x | 54 | x | Comparative Example |
| 29 | 1.1 | x | x | 39 | ○ | Comparative Example |

Regarding heat-resistant sintered material specimens Nos. 1 to 29 having a total composition (overall composition) shown in Table 1, the measurement results of the porosity, the oxidation resistance test results (the increased amounts due to oxidation) and the determination results thereof, the inspection results of ratios of a rust area relating to the salt damage resistance, and the amounts of wear relating the wear resistance and the determination results thereof are shown.

Each of the heat-resistant sintered materials of specimen Nos. 1 to 5, 8 to 10, 14, 15, 18 to 20, 22, 23, 26, and 27 had, as the overall composition, a composition containing, in terms of % by mass, Cr: 15% to 30%, Ni: 8% to 30%, Si: 2.0% to 6.0%, and C: 0.5% to 2.5% with a remainder being Fe and inevitable impurities, a matrix consisted of a Fe—Cr—Ni—Si-based alloy, a hard phase consisted of a Cr—Fe—C-based alloy or a Cr—Ni—Fe—C-based alloy, and the porosity was 2.0% or less.

From the results shown in Tables 1 and 2, it is clear that the heat-resistant sintered materials of specimen Nos. 1 to 5, 8 to 10, 14, 15, 18 to 20, 22, 23, 26, and 27 had excellent oxidation resistance, excellent high-temperature wear resistance, and excellent salt damage resistance.

The desirable amount of Cr in the overall composition ranges from 15% to 30%.

The specimen No. 6 was a specimen in which the amount of Cr in the overall composition was less than the desirable range and had poor oxidation resistance and poor salt damage resistance. The specimen No. 7 was a specimen in which the amount of Cr in the overall composition was more than the desirable range, had a large amount of a ferrite phase, and was a material having a smaller thermal expansion coefficient than austenite. Therefore, in the case where a peripheral member is austenitic steel, it is difficult to control clearance due to the difference in thermal expansion; and therefore, it is difficult to use the specimen as a product such as a bearing and the like.

The desirable amount of Ni in the overall composition ranges from 8% to 30%.

The specimen No. 11 was a specimen in which the amount of Ni in the overall composition was less than the desirable range and had a problem regarding the salt damage resistance. The specimen No. 9 was a specimen containing 25% or more of Ni, but had no problem regarding characteristics. In consideration of the fact that the specimen is an austenite-based material containing Fe as a main component, the upper limit of the amount of Ni in the overall composition is preferably set to be 30%.

The desirable amount of Si in the overall composition ranges from 2.0% to 6.0%.

The specimen No. 12 was a specimen in which the amount of Si in the overall composition was more than the desirable range, a sintered product was hard and brittle, cracks or chips were generated during a cutting process (cutting work), and processing was not possible. The specimen No. 13 was a specimen in which the amount of Si in the overall composition was less than the desirable range and had poor salt damage resistance.

The desirable amount of C in the overall composition ranges from 0.5% to 2.5%.

The specimen No. 16 was a specimen in which the amount of C in the overall composition was more than the desirable range, and more than 40% of the hard phases were precipitated. Thereby, the amount of Cr in the matrix decreased; and as a result, the salt damage resistance became poor. The specimen No. 17 was a specimen in which the amount of C in the overall composition was less than the desirable range, and the precipitated amount of the hard phases was less than 10%. Thereby, the wear resistance became poor.

In the specimen No. 19, the composition was similar to that of the specimen No. 1, the sintering aid was not used, and, instead of it, the fine powder of SUS alloy powder (D50=10 µm) was used. The specimen No. 19 had excellent oxidation resistance and also had excellent salt damage resistance and wear resistance. In the specimen No. 20, the sintering temperature was lowered by 40° C. from the sintering temperature of the specimen No. 19, but a targeted heat-resistant sintered material could be obtained.

The specimen No. 21 was sintered at a sintering temperature lowered by 40° C. from the sintering temperature of the specimen No. 20 so that the density became low. As a result, the heat-resistant sintered material had a low density and a high porosity, the oxidation resistance and the salt damage resistance degraded, and the wear resistance also degraded.

From the results of the specimens of the specimen Nos. 19 to 21, it was found that, even in the case where the sintering aid was not used, a targeted porosity could be obtained and a heat-resistant sintered material exhibiting an intended effect could be obtained by refining the mixed powder (using fine powders as the raw material powders).

The specimen No. 24 is a specimen in which the same raw material powders (particle diameter D50=100 µm) as those in the specimen No. 1 were used and the amount of B in the overall composition was less than 0.08%. In the specimen No. 24, the added amount of FeB as the sintering aid was small, and the oxidation resistance, the salt damage resistance, and the wear resistance were all poor. The specimen No. 25 is a specimen in which the same raw material powders (particle diameter D50=100 µm) as those in the specimen No. 1 were used and the amount of B in the overall composition was more than 0.8%. In the specimen No. 25, the added amount of FeB as the sintering aid was large, and the characteristics were favorable, but there was a problem in that it was not possible to form a product shape having a targeted dimensional accuracy.

The specimen Nos. 22 and 23 had excellent characteristics. From these results, it was determined that, in the case where the raw material powders such as the base powder and the like having a large particle diameter are used and FeB is used as the sintering aid, it is preferable to adjust the added amount of the sintering aid FeB so that the amount of B in the overall composition is in a range of 0.08 to 0.8% by mass.

The specimen No. 28 is a specimen in which the composition was almost the same as that of the specimen No. 1, the added amount of FeP as the sintering aid was small, and the amount of P in the overall composition was smaller than 0.2%. The specimen No. 29 is a specimen in which the added amount of FeP was large and the amount of P in the overall composition was more than 1.2%. The test results of the specimen Nos. 28 and 29 were poor, and the results of the specimen Nos. 26 and 27 were favorable. From these results, it was determined that, in the case where the raw material powders such as the base powder and the like having a large particle diameter are used and FeP is used as the sintering aid, it is preferable to adjust the added amount of the sintering aid FeP so that the amount of P in the overall composition is in a range of 0.2 to 1.2% by mass.

Next, regarding the specimen No. 19, the compositions of the matrix and the hard phase were analyzed using an energy dispersive X-ray fluorescence spectrometer (analyzer) (EDX). As a result, the matrix had a composition containing, in terms of % by mass, Cr: 19.3%, Ni: 21.6%, Si: 3.5%, and a remainder of Fe. The hard phase had a composition containing, in terms of % by mass, Cr: 65.1%, Ni: 1.7%, C: 6.1%, and a remainder of Fe.

From these analysis results, it was found that the matrix was a Fe—Cr—Ni—Si phase and the hard phase was a Cr—Fe—C phase. Strictly speaking, the hard phase was a Cr—Ni—Fe—C phase, but was expressed as a Cr—Fe—C phase since the amount of Ni was small.

Figure 3:
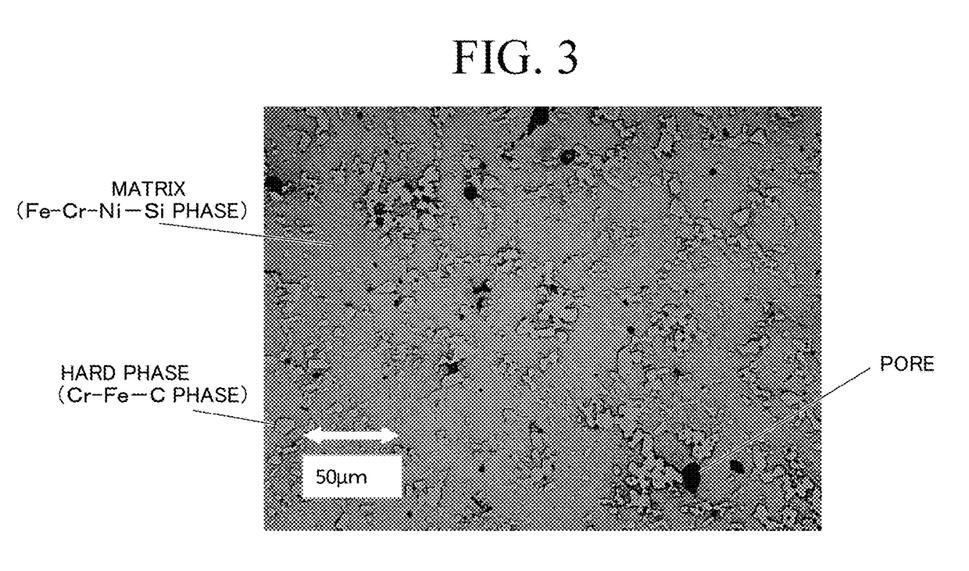
FIG. 3 is a structural photograph showing an example of a metallographic structure of a specimen produced in examples.

FIG. 3 is an enlarged photograph of a surface structure (metallographic structure) of the specimen No. 19 shown in Tables 1 and 2. As shown in this structural photograph, the specimen of the heat-resistant sintered material exhibited a structure in which irregular hard phases (Cr—Fe—C phases) were dispersed in a matrix (Fe—Cr—Ni—Si phase). In addition, a plurality of fine pores indicated by black circles were dispersed in the structure.

INDUSTRIAL APPLICABILITY

According to the present embodiment, it is possible to provide a heat-resistant sintered material having excellent oxidation resistance, salt damage resistance, and wear resistance. Therefore, the present embodiment can be preferably applied to a mechanism component such as a bearing, a bush, or the like that is installed in a turbocharger; a shaft member, a rod member, a bearing member, or a plate that is provided in a nozzle mechanism or a valve mechanism of a turbocharger; and producing steps thereof.

EXPLANATION OF REFERENCE SIGNS

1: bearing member (heat-resistant sintered material), 2: matrix (Fe—Cr—Ni—Si phase), 3: hard phase (Cr—Fe—C phase), and 4: pore (hole).

The invention claimed is:

1. A heat-resistant sintered material having an overall composition consisting of, in terms of % by mass:
   Cr: 15% to 30%;
   Ni: 8% to 30%;
   Si: 2.0% to 6.0%;
   C: 0.5% to 2.5%;
   B: 0.08% to 0.8%; and
   a remainder of Fe and inevitable impurities, wherein
   the heat-resistant sintered material has a structure in which hard phases are dispersed in a matrix, the matrix including Fe, Cr, Ni, and Si, and the hard phases including Fe, Cr, and C, and
   a porosity is 2.0% or less.

2. A heat-resistant sintered material, having an overall composition consisting of, in terms of % by mass:
   Cr: 15% to 30%;
   Ni: 8% to 30%;
   Si: 2.0% to 6.0%;
   C: 0.5% to 2.5%;
   B: 0.08% to 0.8%;
   P: 0.2% to 1.2%; and
   a remainder of Fe and inevitable impurities, wherein
   the heat-resistant sintered material has a structure in which hard phases are dispersed in a matrix, the matrix including Fe, Cr, Ni, and Si, and the hard phases including Fe, Cr, and C, and
   a porosity is 2.0% or less.

3. The heat-resistant sintered material according to claim 1, wherein the matrix consists of an austenite matrix, the hard phases are hard particles including Fe, Cr, and C, and the hard particles are dispersed in the austenite matrix in an amount of 10% to 40% by volume.

4. A method for producing the heat-resistant sintered material of claim 1, the method comprising:
   a step of mixing a base powder, an additive material powder and an FeB powder so as to obtain a mixed powder consisting of, in terms of % by mass, Cr: 15% to 30%, Ni: 8% to 30%, Si: 2.0% to 6.0%, C: 0.5% to 2.5%, B: 0.08% to 0.8% and a remainder of Fe and inevitable impurities;
   a step of pressurizing the mixed powder so as to produce a green compact; and
   a step of heating the green compact at a temperature of 1,100° C. to 1,280° C. so as to form a sintered body having a porosity of 2.0% or less and a structure in which hard phases including Fe, Cr, and C are dispersed in a matrix including Fe, Cr, Ni, and Si, wherein
   the base powder consists of Fe, Cr, and Ni or consists of Fe, Cr, Ni, and Si, and
   the additive material powder consists of Si and C or consists of either one or both of Fe and Cr together with Si and C.

5. A method for producing the heat-resistant sintered material of claim 2, the method comprising,
   a step of mixing a base powder, an additive material powder and FeP powder so as to obtain a mixed powder having a composition consisting of, in terms of % by mass, Cr: 15% to 30%, Ni: 8% to 30%, Si: 2.0% to 6.0%, C: 0.5% to 2.5%, B: 0.08% to 0.8%, P: 0.2% to 1.2%, and a remainder of Fe and inevitable impurities;
   a step of pressurizing the mixed powder so as to produce a green compact; and
   a step of heating the green compact at a temperature of 1,100° C. to 1,280° C. so as to form a sintered body having a porosity of 2.0% or less and a structure in which hard phases including Fe, Cr, and C are dispersed in a matrix including Fe, Cr, Ni, and Si, wherein
   the base powder consists of Fe, Cr, and Ni or consists of Fe, Cr, Ni, and Si, and
   the additive material powder consists of Si and C or consists of either one or both of Fe and Cr together with Si and C.

6. The method for producing a heat-resistant sintered material according to claim 4, wherein the hard phases are dispersed in the matrix in an amount of 10% to 40% by volume by the step of forming the sintered body.

* * * * *